Patented Aug. 15, 1944

2,355,712

UNITED STATES PATENT OFFICE 2,355,712

PRODUCTION OF CELLULOSE ESTERS

Henry Dreyfus, London, England, assignor to Celanese Corporation of America, a corporation of Delaware No Drawing. Application July 18, 1941, Serial No. 402,942. In Great Britain August 15, 1940

5 Claims. (Cl. 260—227)

This invention relates to improvements in the acetylation or other esterification of cellulose.

As is well known, the acetylation of cellulose is usually conducted, after pretreatment with acetic acid or acetic acid and sulphuric acid, with a mixture of acetic acid and acetic anhydride in presence of substantial proportions of sulphuric acid, for example 10–20% by weight of sulphuric acid on the weight of the cellulose. The proportion of acetic anhydride is for economic and other reasons usually reduced to a minimum. The theoretical proportion of acetic anhydride required for the tri-acetylation of bone-dry cellulose is about 190% of the pure anhydride on the weight of the cellulose, while with cellulose containing 5% of its weight of water, the proportion rises to rather more than 200%. In practice, proportions of the order of 225–275% are employed. Similarly the amount of acetic acid is reduced to a minimum, consistent with the production of the required viscosity. In this connection, as my U. S. Patent No. 1,708,787 indicates, the higher the proportion of acetic acid present, the higher is the viscosity of the cellulose acetate obtained. These economic considerations arise from the fact that when the acetylation is complete, the primary acetylation solution is mixed with a sufficient quantity of water to eliminate the excess of acetic anhydride and to leave a small amount of water in the solution and left to stand while the cellulose acetate ripens to acetone-solubility, and then the cellulose acetate is precipitated with water. In the process of ripening, the residual acetic anhydride present in the primary mixture is hydrolysed to acetic acid, while in the precipitation the acetic acid is diluted to a very considerable extent and has to be recovered from the aqueous solution. If one attempts to precipitate the cellulose acetate from its acetylation solution before or after ripening by means of organic precipitants, a glassy product is produced which is very difficult to wash and stabilise, and which is also difficult to re-dissolve in that the process of re-solution takes a long time. Moreover, if the primary cellulose acetate is precipitated with water without ripening, a glassy product is also produced.

Various attempts have also been made to reduce the quantity of sulphuric acid used for the acetylation, but the results have not been encouraging from the commercial point of view. In some cases, reduction of the quantity of sulphuric acid, for example to proportions of the order of 5% or less on the weight of the cellulose, leads to gelling or complete solidification of the acetylation solution towards the completion of the acetylation reaction. Furthermore, in all cases the time taken for the acetylation is very prolonged when using such small quantities of sulphuric acid. Lastly, with the normal acetylation process using proportions of sulphuric acid of the order of 10% or more on the weight of the cellulose, intensive cooling has to be applied, for example by means of brine jackets on the acetylators, in order to prevent the exothermic acetylation reaction causing such a rise in temperature that the cellulose is seriously degraded.

I have now found that good acetylation products can be produced with a small quantity of sulphuric acid based on the cellulose, provided that the amount of acetic anhydride used for the acetylation is increased to an amount considerably above that normally used. By small quantities of sulphuric acid I mean proportions on the weight of the cellulose of the order of 5% or less, and preferably much less, for example 2%, 1%, down to 0.2%, 0.1% or even 0.05%. I have found that with these very low proportions of sulphuric acid, solution of the cellulose in the acetylating medium can be achieved in quite a short time if the proportion of acetic anhydride present is of the order of 5 or more times the weight of the cellulose, and preferably 10–20 times or more. Such proportions of anhydride, particularly when associated with the very low proportions of sulphuric acid, such as 0.5% downwards, serve to acetylate the cellulose in such a way that the reaction is at all times controllable and it is unnecessary to use brine cooling, and at the same time there is no tendency for the acetylation solution to gel or solidify. In some cases gentle heating may be resorted to, for example to a peak temperature of 40°, 50° or even 60° C., or at the most mild cooling is necessary, such as cooling with river water.

The acetic anhydride may be the sole constituent of the acetylating bath apart from the sulphuric acid or other catalyst, or it may be somewhat diluted with other agents, for instance with solvents for the cellulose acetate being produced, or with diluents which may be present in sufficient quantity to prevent solution of the cellulose acetate. Here, however, caution has to be used, since if too much of such other solvents or diluents is associated with the acetic anhydride the beneficial effect of the high proportion of the latter may be offset. For example, good results are obtainable with an acetylating bath consisting of 6 times the weight of the cellulose of acetic anhydride, whereas if the same amount of acetic anhydride be diluted with two-thirds its weight of acetic acid, the results obtained are not quite so good, and if it be diluted with an equal weight of acetic acid the results are quite substantially inferior. However, where a quantity of acetic anhydride equal to 10 times the weight of the cellulose is used, it may be diluted with an equal weight of acetic acid. Similar considerations apply in using benzene or other non-solvent for the cellulose acetate together with the acetic anhydride. The amount of benzene or similar diluents may be such that the cellulose acetate still goes into solution, or the benzene may be used in a preponderating proportion so that solution does not occur. In either case the acetic anhydride must be so proportioned to the cellulose that the new results of acetylation in a controllable way to give a good clarity and whiteness of the cellulose acetate are obtained.

Still better results are obtained if the cellulose is subjected to a pretreatment, and particularly a pretreatment with acetic acid mixed with some sulphuric acid. The whole of the sulphuric acid necessary for the subsequent acetylation may be introduced into the cellulose during this pretreatment, or alternatively only a portion of the sulphuric acid to be used for acetylation may be introduced at this stage. A very convenient bath for the pretreatment consists of a bath of glacial acetic acid or slightly aqueous acetic acid, say one containing up to 5% of water, containing an amount of sulphuric acid equal to 0.1% of its weight. Such a bath may be used in a proportion of about 10 times the weight of the cellulose, and may be allowed to act upon the cellulose for some 8–16 hours at ordinary atmospheric temperature, or for a shorter period at raised temperatures, for example for about 1–2 hours at a temperature of 40–50° C. After such a period the cellulose is squeezed so as to retain its own weight of the pretreatment liquor, and is then immersed in the acetylation bath. In the specific example given above of a pretreatment of the cellulose in a 1:10 volume ratio with a bath containing 0.1% of its weight of sulphuric acid, after the pretreatment the cellulose contains 100% of its weight of acetic acid and about 0.2% of its weight of sulphuric acid when using 95% aqueous acetic acid. With less water in the acetic acid, the amount of sulphuric acid absorbed by the cellulose is correspondingly higher. Such a pretreated cellulose is eminently suitable for acetylation by the process described above without additional sulphuric acid. If, for example, it be acetylated with 10 times its weight of acetic anhydride used as the sole constituent of the acetylating bath, solution occurs in a comparatively few hours to give a bright clear dope containing a cellulose acetate of high clarity and whiteness.

Still lower proportions of sulphuric acid may be used. For example the cellulose may be pretreated with a bath of acetic acid containing 0.1% of sulphuric acid based on the cellulose, pressed as before so as to retain its own weight of pretreating liquor and then acetylated without further sulphuric acid or if desired further sulphuric acid may be added before or during the acetylation.

According to the present invention, the primary cellulose acetates produced as described above are not ripened in the primary acetylation solution, as is the usual practice, but are precipitated from that solution and separately ripened. Moreover, it is best not to carry out the precipitation of the primary acetylation solution with water, as is the common practice, but to use organic non-solvents for cellulose acetate, for example hydrocarbons, e. g. petroleum hydrocarbons such as petroleum ether, gasoline, kerosene and the like, or aromatic hydrocarbons such as benzene, toluene and xylene, or chlorinated hydrocarbon non-solvents, e. g. carbon tetrachloride, or non-solvent ethers, e. g. diethyl ether, di-isopropyl ether and the like. Here again there is a marked difference between the properties of the cellulose acetate and its solutions, and those of the cellulose acetates of present-day practice. As already indicated, if a cellulose acetate as produced commercially is precipitated from its primary acetylation solution by an organic diluent, a glassy product is obtained, difficult to wash, stabilise and re-dissolve. According to the present invention, on the other hand, the product on precipitation from its primary acetylation solution by an organic diluent appears in a fibrous or flaky form, which is quite easy to wash, stabilise or re-dissolve. The same applies to the case when the primary acetylation solution is precipitated by means of water, though naturally this procedure is not advantageous since it involves loss of large quantities of acetic anhydride.

As already indicated, the ripening is not carried out in the primary acetylation solution but is carried out as a separate operation. Preferably it is effected in solution, for example in solution in acetic acid, dioxane, methylene chloride, ethylene chloride or mixtures of any of these. The solvent is preferably chosen so that it is miscible with the whole of the water it is desired to use for ripening and at the same time completely dissolves the cellulose acetate to form a clear solution. The cellulose acetate may be dissolved in the solvent and the necessary quantity of water added, together, if desired, with sulphuric acid or other mineral acid which will accelerate the ripening, for example phosphoric acid or hydrochloric acid, or the cellulose acetate may be dissolved directly in the aqueous solvent already containing the desired amount of water for ripening, and if desired already containing any mineral acid desired. Where a mineral acid is present in the ripening mixture, the ripening is preferably carried out at fairly low temperatures, for example atmospheric temperatures up to about 27 or 30° C. With small quantities of sulphuric acid or similar agent, somewhat higher temperatures may be used, for example up to 40° C. or 45° C., while in the substantial absence of mineral acids ripening may be carried out at much higher temperatures, for example 70° C. or 80° C. or even up to the boiling point. The subsequent precipitation of the cellulose acetate from the ripening medium may be effected as usual in the art by means of water, or better the cellulose acetate is again precipitated by means of an organic diluent, for example of the type referred to above.

The new invention has been described above with reference to the acetylation of cellulose. It may also be applied to the esterification of cellulose broadly, for example to produce lower fatty acid esters of cellulose, such as cellulose propionate, cellulose butyrate and the like. Mixed esters may also be produced, for example by using a mixture of the appropriate anhydrides. Again, sulphuric acid has been referred to as the catalyst present during the acetylation and during the pretreatment. Other agents which act in a similar way, for example phosphoric acid or mixtures of sulphuric acid and phosphoric acid, may be employed instead.

The following examples illustrate the invention but do not limit it in any way.

Example 1

100 parts of cotton linters are pretreated for 8–16 hours with 10 times their weight of 95% aqueous acetic acid containing 0.1% sulphuric acid based on the weight of the bath. At the conclusion of the pretreatment the cotton linters are pressed out so that they contain their own weight of pretreating liquid. They are then immersed in a bath containing 1000 parts of acetic anhydride, 1000 parts of acetic acid and 5 parts of sulphuric acid. Acetylation is conducted at a temperature of approximately 25–30° C. and is complete, producing a clear bright dope, in about 5–6 hours. The conditions are such that little or no cooling is required to keep the temperature at the stated level, and the ordinary brine cooling is entirely eliminated. The cellulose acetate produced is precipitated with benzene, the precipitated product washed thoroughly with hot acetone and then with water. After drying, it is dissolved in a bath consisting of 7½ parts of ethylene chloride and 7½ parts of acetic acid to each part of cellulose acetate, and containing 25% on the original weight of the cellulose of water and 2% of sulphuric acid. Ripening is conducted at 30–35° C. until the product is soluble in acetone. Solubility in acetone appears at about 56–57% acetic acid, and the cellulose acetate may be precipitated at this stage, or, if a lower acetyl value, for example 54% acetic acid, is required, ripening is continued to this stage. In both cases the cellulose acetate is again precipitated by means of benzene, washed and dried. It has a very low sulphate content and is readily soluble in acetone, giving a clear bright dope.

Example 2

100 parts of cotton linters are pretreated with 10 times their weight of a bath consisting of 98.5% aqueous acetic acid containing on the weight of the bath 0.1% of sulphuric acid. The pretreatment is carried out for 4–8 hours, after which the cotton linters are pressed so as to retain their own weight of pretreatment liquid. The pretreated linters are then acetylated and ripened as described in Example 1, but without the additional sulphuric acid during the acetylation stage.

Example 3

Cotton linters are pretreated as described in Example 2 and then acetylated with acetic anhydride in a proportion of 10 times the weight of the linters and without additional sulphuric acid. The acetylation is conducted so as to reach a peak temperature of about 35–40° C. Precipitation and ripening are thereafter conducted as before.

Example 4

100 parts of cotton linters are pretreated as described in Example 2 and acetylated in a bath containing 750% of butyric anhydride and 750% acetic anhydride, both based on the weight of the linters. Esterification is effected so as to reach a peak temperature of 40° C., and when solution is complete the dope is poured into cold water containing 0.5% of its weight of soda ash, and vigorously agitated. The mixed ester is separated, boiled in water, again separated, and dried.

Having described my invention, what I desire to secure by Letters Patent is:

1. Process for the production of lower fatty acid esters of cellulose which comprises esterifying cellulose in a liquid medium which is a solvent for the ester produced, and which contains an amount of lower fatty acid anhydride at least five times the weight of the cellulose, and an amount of sulphuric acid catalyst not exceeding 5% of the weight of the cellulose, precipitating the cellulose ester, redissolving the same in an organic solvent at least partially miscible with water and then ripening it in said solution.

2. Process for the production of cellulose acetate which comprises acetylating cellulose in a liquid medium which is a solvent for the acetate produced, and which contains an amount of acetic anhydride at least five times the weight of the cellulose, and an amount of sulphric acid catalyst not exceeding 5% of the weight of the cellulose, precipitating the cellulose acetate, redissolving the same in an organic solvent at least partially miscible with water and then ripening it in said solution.

3. Process for the production of lower fatty acid esters of cellulose which comprises pretreating cellulose with a lower fatty acid containing a small proportion of mineral acid, esterifying the pre-treated cellulose in a liquid medium which is a solvent for the ester produced, and which contains an amount of lower fatty acid anhydride at least five times the weight of the cellulose, and an amount of sulphuric acid catalyst not exceeding 5% of the weight of the cellulose, precipitating the cellulose ester, redissolving the same in an organic solvent at least partially miscible with water and then ripening it in said solution.

4. Process for the production of cellulose acetate which comprises pre-treating cellulose with acetic acid containing a small proportion of sulphuric acid, acetylating the pre-treated cellulose in a liquid medium which is a solvent for the acetate produced, and which contains an amount of acetic anhydride at least five times the weight of the cellulose, and an amount of sulphric acid catalyst not exceeding 5% of the weight of the cellulose, precipitating the cellulose acetate, redissolving the same in an organic solvent at least partially miscible with water and then ripening it in said solution.

5. Process for the production of cellulose acetate which comprises acetylating cellulose in a liquid medium which is a solvent for the acetate produced, and which contains an amount of acetic anhydride at least five times the weight of the cellulose, precipitating the cellulose acetate with an organic non-solvent therefor, redissolving the same in an organic solvent at least partially miscible with water and then ripening it in said solution containing water and a small proportion of sulphuric acid.

HENRY DREYFUS.